United States Patent [19]
Veldman

[11] Patent Number: 5,959,411
[45] Date of Patent: Sep. 28, 1999

[54] ONE PIN IC CONTROL CIRCUIT FOR A DISCHARGE LAMP

[75] Inventor: Paul R. Veldman, Oss, Netherlands

[73] Assignee: U.S. Philips Corporation, New York, N.Y.

[21] Appl. No.: 08/891,604

[22] Filed: Jul. 11, 1997

[30] Foreign Application Priority Data

Sep. 11, 1996 [EP] European Pat. Off. ............... 96202533

[51] Int. Cl.⁶ .................................................. H05B 37/02
[52] U.S. Cl. ........................ 315/224; 315/307; 315/291; 315/208
[58] Field of Search ................. 315/307, DIG. 5, 315/244, 287, 291, 119, 208, DIG. 7, 224, 308, 247

[56] References Cited

U.S. PATENT DOCUMENTS

| | | | |
|---|---|---|---|
| 4,471,269 | 9/1984 | Ganser et al. ........................... | 315/224 |
| 4,952,849 | 8/1990 | Fellows et al. .......................... | 315/307 |
| 5,198,726 | 3/1993 | Van Meurs et al. ..................... | 315/224 |
| 5,463,281 | 10/1995 | Linssen ............................. | 315/DIG. 5 |
| 5,608,294 | 3/1997 | Derra et al. ............................. | 315/224 |

*Primary Examiner*—Don Wong
*Assistant Examiner*—Wilson Lee
*Attorney, Agent, or Firm*—Bernard Franzblau

[57] ABSTRACT

A circuit arrangement for supplying a discharge lamp comprises a control circuit which is provided with an integrated circuit. Means for generating a signal which is a measure of the lamp voltage are coupled to one pin of the integrated circuit. The periodic switching of the integrated circuit between a first and a second state insures that the lamp voltage will not exceed a minimum admissible value and a maximum admissible value. The use of only one pin makes the integrated circuit simple and accordingly inexpensive, while in addition only a small number of external components is required.

24 Claims, 3 Drawing Sheets

5,959,411

ONE PIN IC CONTROL CIRCUIT FOR A DISCHARGE LAMP

BACKGROUND OF THE INVENTION

The invention relates to a circuit arrangement for operating a discharge lamp, provided with input terminals for coupling to a supply voltage source, means I coupled to the input terminals for generating a current through the discharge lamp from a supply voltage delivered by the supply voltage source, a control circuit for controlling the operational state of the means I, comprising means II for generating a signal S which is a measure of the value of an operating parameter, an integrated circuit provided with an input terminal T coupled to the means II, means C for generating a first internal reference signal, means E coupled to input terminal T for generating an internal signal $S_{int}$ derived from the signal S, comparator means Comp provided with an output, a first input coupled to the means C, and a second input coupled to the means E, and means III coupled to the output of the comparator means Comp for changing the operational state of the means I.

Such a circuit arrangement is known from U.S. Pat. No. 4,952,849 (hereby incorporated by reference). The signal S in the known circuit arrangement, which is a measure of the value of an operating parameter, is a signal which is a measure of the current through the discharge lamp (also referred to the lamp hereinafter). The control circuit achieves that the amplitude of the current through the lamp remains approximately constant. It is also possible to choose an alternative operating parameter such as, for example, the voltage across the lamp. If, for example, the discharge lamp fails to ignite after the circuit arrangement has been switched on, the voltage across the discharge lamp will rise to the point where the internal signal $S_{int}$ exceeds the value of the first internal reference signal. This activates the means III. The means III effect a change in the operating state of the means I such that this causes the voltage across the discharge lamp to drop. It can be achieved thereby that the voltage across the discharge lamp is not maintained at a high value by the circuit arrangement for a long period if the discharge lamp should fail to ignite. It is desirable in many cases not only to provide measures which ensure that the value of an operating parameter does not exceed a maximum admissible value (for a long period), but also to ensure that the same operating parameter cannot assume an undesirably low value. If the operating parameter is the voltage across the discharge lamp, a (too) low value of this voltage may point to a (too) high value of the current through the discharge lamp or a defect in a capacitor connected parallel to the discharge lamp. It may also be desirable, for example, to limit the voltage across the discharge lamp to a first maximum admissible value during ignition and to a second maximum admissible value during stationary lamp operation, which latter value must not be exceeded for more than a predetermined time interval. A change in the operational state of the means I is indicated, for example, by switching-off of the means I, if a maximum or minimum admissible value is exceeded. It is possible to design the control circuit such that the means II are coupled to only one input terminal of the integrated circuit, and that one and the same signal $S_{int}$ is compared with a first internal reference signal and with a second internal reference signal. Such a construction of the control circuit, however, makes it necessary to lay down the relationship between the two internal reference signals in the integrated circuit. The relationship between the two reference values, for example, the relationship between the minimum admissible value and the maximum admissible value of the operating parameter, is then also laid down in such a construction of the control circuit. The minimum admissible value and the maximum admissible value of an operating parameter, such as the voltage across the discharge lamp, however, are generally speaking dependent on specific properties of the discharge lamp and of the construction of the circuit arrangement. It is desirable for this reason to have a mechanism for setting these reference values independently of one another. This is possible through the use of two input terminals of the integrated circuit. These two input terminals are coupled to the means II in that case, and each of the input terminals is coupled to comparator means and means for generating a reference signal. Such a solution, however, requires a comparatively large number of input terminals, which renders the integrated circuit large and expensive. In addition, this solution often requires a comparatively large number of external components, so that the circuit arrangement becomes complicated and expensive.

SUMMARY OF THE INVENTION

The invention has for an object to provide a circuit arrangement of the kind mentioned in the opening paragraph with which it is possible to adjust two reference values of the signal S independently of one another, while the means II are coupled to only one input terminal.

According to the invention, a circuit arrangement of the kind mentioned in the opening paragraph is for this purpose characterized in that the means II are coupled to the input terminal T via an impedance P, and in that the integrated circuit is in addition provided with means D coupled to the comparator means Comp for generating a second internal reference signal, means IV for changing the amplitude of an electrical quantity G present at the input terminal T from a first to a second value, and for changing the operational state of the comparator means Comp from a first state to a second state, said comparator means Comp comparing the internal signal $S_{int}$ with the first internal reference signal in the first state and comparing the internal signal $S_{int}$ with the second internal reference signal in the second state.

The comparator means Comp are in the first state when the amplitude of the electrical quantity G has the first value, in which case the internal signal $S_{int}$ is compared with the first internal reference signal. This means that the signal S is compared with a first reference value derived from the first internal reference signal. If the amplitude of the electrical quantity G has the second value, the internal signal $S_{int}$ is compared with the second internal reference signal. This means that the signal S is compared with a second reference value derived from the second internal reference signal. Although the first and the second internal reference signal have been laid down in the integrated circuit, it is possible to adjust the first and the second reference value independently of one another by means of the impedance value of impedance P and the dimensioning of the means II.

The means III change the operational state of the means I whenever the signal S has passed one of these reference values.

The electrical quantity G may be the voltage present at the input terminal T, in which case the means IV are provided with means for changing the amplitude of the voltage present at the input terminal from a first value V1 to a second value V2. Preferably, the second value V2 is chosen to be zero. The integrated circuit may be of a comparatively simple construction in that case.

The electrical quantity G may alternatively be the current flowing through the input terminal. In that case the means IV are provided with means for changing the amplitude of the current flowing through the input terminal from a first value I1 to a second value I2. It is advantageous in this latter case for the means IV to comprise a first current source and a second current source, the first current source supplying a current whose amplitude is equal to the first value I1 and the second current source supplying a current whose amplitude is equal to the second value I2. Preferably, the second value I2 is chosen to be zero. The integrated circuit then can be of a comparatively simple construction.

Preferably, the means IV are provided with means IVa for periodically changing the amplitude of the electrical quantity G from the first value to the second value and vice versa at a frequency f and for periodically changing the operational state of the comparator means Comp from the first state to the second state and vice versa. It is possible in that case to repeat the comparison of the signal S with the reference values continuously and thus to monitor the relevant operating parameter during a longer period. If the means I comprise at least a switching element and means IVb for rendering the switching element conducting and non-conducting during lamp operation, the frequency with which the switching element is rendered conducting and non-conducting is preferably chosen to be equal to the frequency f, and the changes in amplitude of the electrical quantity G and in the operational state of the comparator means Comp take place in synchronism with the cycle in which the switching element is rendered conducting and non-conducting.

Good results were obtained with embodiments of the circuit arrangement according to the invention in which the impedance comprises an ohmic resistance.

A comparatively simple construction of the integrated circuit is possible if the first internal reference signal is equal to the second internal reference signal, and the means D are formed by the means C.

BRIEF DESCRIPTION OF THE DRAWINGS

Embodiments of a circuit arrangement according to the invention will be explained in more detail with reference to the accompanying drawing, in which.

DESCRIPTION OF THE PREFERRED EMBODIMENTS

Figure 1:
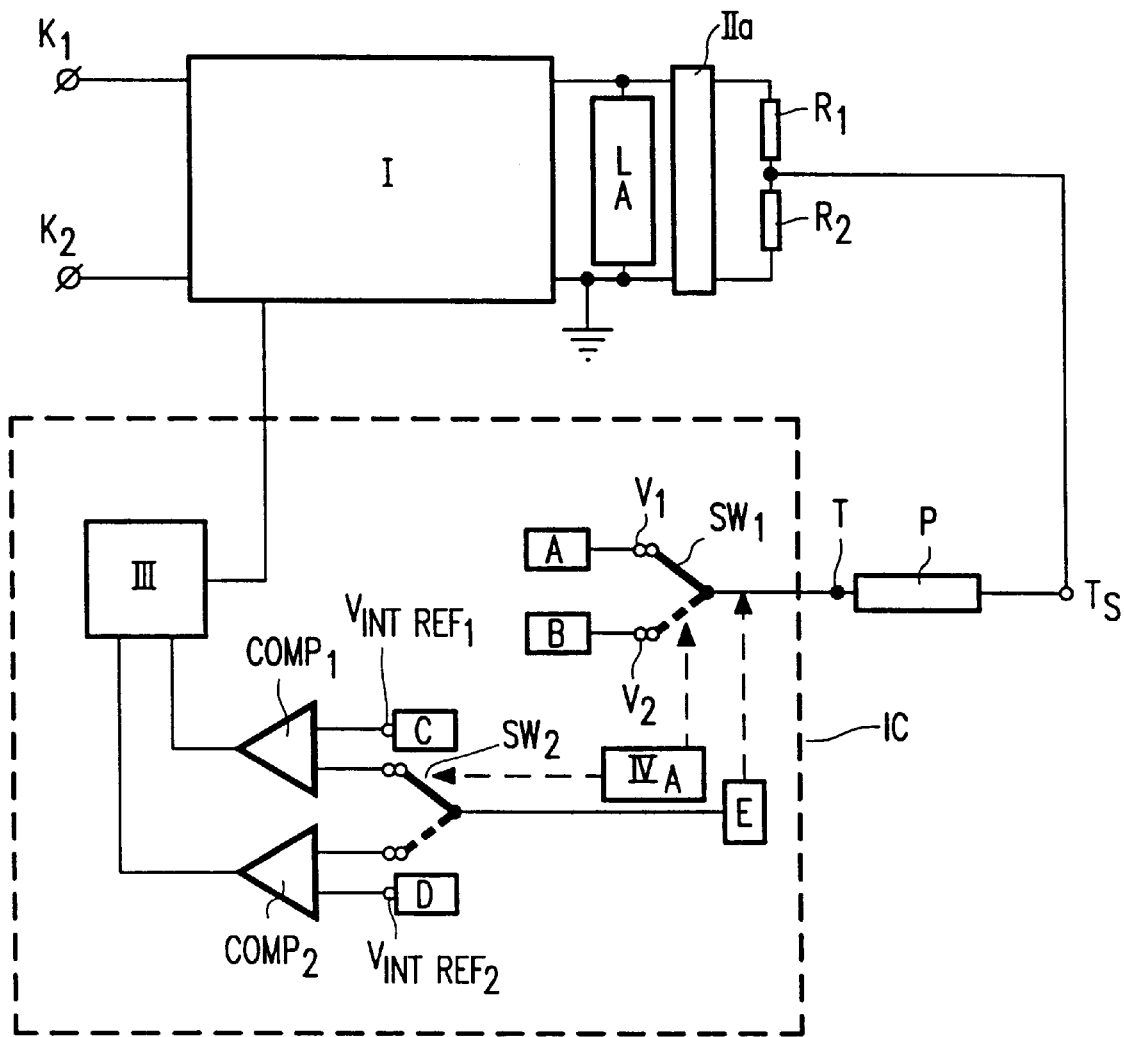
FIGS. 1, 2 and 3 are diagrams of embodiments of a circuit arrangement according to the invention.

In FIG. 1, K1 and K2 form input terminals for coupling to a supply voltage source. Circuit portion I in this embodiment forms the means I coupled to the input terminals for generating a current through the discharge lamp from a supply voltage delivered by the supply voltage source. The current through the discharge lamp is a high-frequency alternating current in this embodiment. A discharge lamp La is connected to respective output terminals of the means I.

Ohmic resistors R1 and R2 together with circuit portion IIa form the means II in this embodiment for generating a signal S which is a measure of the value of an operating parameter. The operating parameter is the amplitude of the AC voltage present across the discharge lamp La during lamp operation in this embodiment. Circuit portion IIa may comprise, for example, means for generating a DC voltage signal which is a measure of the rms value of the voltage across the discharge lamp. Another possibility is that circuit portion IIa comprises means for generating a DC voltage signal which is a measure of the sum of the amplitudes of the voltages across the discharge lamp in both directions. Ohmic resistor P in this embodiment forms an impedance P. The other circuit portions and components shown in FIG. 1 together form an integrated circuit IC. T is an input terminal of the integrated circuit IC which is coupled to the means II via ohmic resistor P. Circuit portion IVa together with switching element Sw1 and switching element Sw2 forms the means IV and at the same time means for periodically changing the amplitude of an electrical quantity G present at the input terminal from a first to a second value and vice versa and for changing the operational state of the comparator means Comp from a first state to a second state, said comparator means Comp comparing an internal signal $S_{int}$ with a first internal reference signal in the first state and comparing the internal signal $S_{int}$ with a second internal reference signal in the second state.

The quantity G present at the input terminal in this embodiment is formed by the voltage applied to the input terminal, having a first value V1 and a second value V2. A, B, C and D are circuit portions for generating, in that order, a voltage whose amplitude is equal to the first value V1, a voltage whose amplitude is equal to the second value V2, a voltage which in this embodiment forms the first internal reference signal, and a voltage which in this embodiment forms the second reference signal. Furthermore, the integrated circuit IC comprises a circuit portion E, two comparators Comp1 and Comp2, and a circuit portion III which in this embodiment forms the means III for changing the operational state of the means I when the signal S has passed a reference value which is derived from the internal reference signal. The circuit portion E in this embodiment forms means E for generating the internal signal $S_{int}$ which is derived from the signal S. The comparators Comp1 and Comp2 in this embodiment form the comparator means Comp.

Ends of the discharge lamp La are connected to respective inputs of circuit portion IIa. A first output of circuit portion IIa is connected to a second output by means of a series circuit of ohmic resistor R1 and ohmic resistor R2. A common junction point of ohmic resistor R1 and ohmic resistor R2 is connected to terminal Ts. Terminal Ts is connected to input terminal T via ohmic resistor P. Input terminal T is connected to a first main electrode of switching element Sw1. A second and a third main electrode of switching element Sw1 are connected to an output of circuit portion A and an output of circuit portion B, respectively. E is a circuit portion for generating a voltage which is proportional to the current through the input terminal T. An input of circuit portion E is for this purpose coupled to input terminal T. An output of circuit portion E is connected to a first main electrode of switching element Sw2. A second and a third main electrode of switching element Sw2 are connected to an input of comparator Comp1 and to an input of comparator Comp2, respectively. A further input of comparator Comp1 is connected to an output of circuit portion C, and a further input of comparator Comp2 is connected to an output of circuit portion D. Outputs of the circuit portion IVa are coupled to respective control electrodes of switching elements Sw1 and Sw2. This coupling is indicated with broken lines in FIG. 1. An output of comparator Comp1 is connected to an input of circuit portion III. An output of comparator Comp2 is connected to a further input of circuit portion III. An output of circuit portion III is connected to an input of circuit portion I.

The operation of the circuit arrangement shown in FIG. 1 is as follows.

When the input terminals K1 and K2 are connected to a supply voltage source, the means I generate a high-frequency alternating current through the discharge lamp from a supply voltage delivered by this supply voltage source during stationary lamp operation. Before the stationary lamp operation phase, the circuit portion I generates an ignition voltage across the discharge lamp La during the ignition phase. A signal S, which is generated by the means II and which is a measure of the amplitude of the voltage across the discharge lamp La, is present at terminal Ts both during the ignition phase and during stationary lamp operation. The circuit portion IVa periodically switches the integrated circuit from a first to a second state and vice versa by means of switching elements Sw1 and Sw2. In the first state, the input terminal T is connected to the output of circuit portion A, and the output of circuit portion E is connected to the further input of comparator Comp1. Voltage V1 is present at the input terminal T. In the second state, input terminal T is connected to the output of circuit portion B, and the output of circuit portion E is connected to the further input of comparator Comp2. Voltage V2 is present at the input terminal T. The outputs of comparators Comp1 and Comp2 are both low immediately after the circuit arrangement has been switched on. If the voltage present at the output of circuit portion E is higher than the first internal reference value in the first state, the output of comparator Comp1 will change from low to high, which activates the circuit portion III and changes the operational state of the circuit portion I. The following equation holds for the voltage S1 at terminal Ts if that current through input terminal T for which the voltage $S_{int}$ at the output of circuit portion E is equal to the first internal reference value is equal to I1:

$$S1 = I1*(R)P + V1, \quad (I)$$

in which (R)P is the resistance value of ohmic resistor P.

This voltage S1 is the first reference value of the signal S. The signal S is accordingly compared with the first reference value S1 in the first state, S1 being dependent on the current I1, which in its turn is determined by the first internal reference value formed by the output voltage of circuit portion C via circuit portion E. The operational state of circuit portion I is changed if the signal S exceeds the first reference value S1.

The output of comparator Comp2 changes from low to high, whereby the circuit portion III is activated and the operational state of the circuit portion I is changed, if in the second state the voltage $S_{int}$ present at the output of circuit portion E is lower than the second internal reference value. The following is true for the voltage S2 at terminal Ts if the current through input terminal T for which the voltage at the output of circuit portion E is equal to the second internal reference value is equal to I2:

$$S2 = I2*(R)P + V2. \quad (II)$$

This voltage S2 is the second reference value of the signal S. The signal S is accordingly compared with the second reference value S2 in the second state, S2 being determined by current I2 which in its turn is determined via circuit portion E by the second internal reference value formed by the output voltage of circuit portion D. The operational state of circuit portion I is changed if the signal S is lower than the second reference value S2.

The ratio I1/I2=y is a fixed one because the circuit portions E, C and D form part of the integrated circuit IC. If the desired ratio of the first and the second reference signals S1/S2 is x, substitution of x and y in equation I and equation II gives:

$$S1 = x*(y*V2 - V1)/(y-x)$$

$$S2 = (y*V2 - V1)/(y-x)$$

It is also true that:

$$R = (x*V2 - V1)/((y-x)*I2)$$

The ratio of the resistance values of ohmic resistors R1 and R2 is chosen such that the signal S at terminal Ts reaches the value S1 when the voltage across the discharge lamp reaches its maximum admissible value. Given this ratio of the resistance values of ohmic resistors R1 and R2, the signal at terminal Ts will reach the value S2 when the voltage across the discharge lamp La reaches its minimum admissible value. The internal reference values I1 and I2 correspond to the external reference values S1 and S2 given the value of ohmic resistor R in accordance with the equation. It is thus possible to adjust the reference values S1 and S2 mutually independently to desired levels through a suitable choice of the resistors R1, R2 and R.

Figure 2:
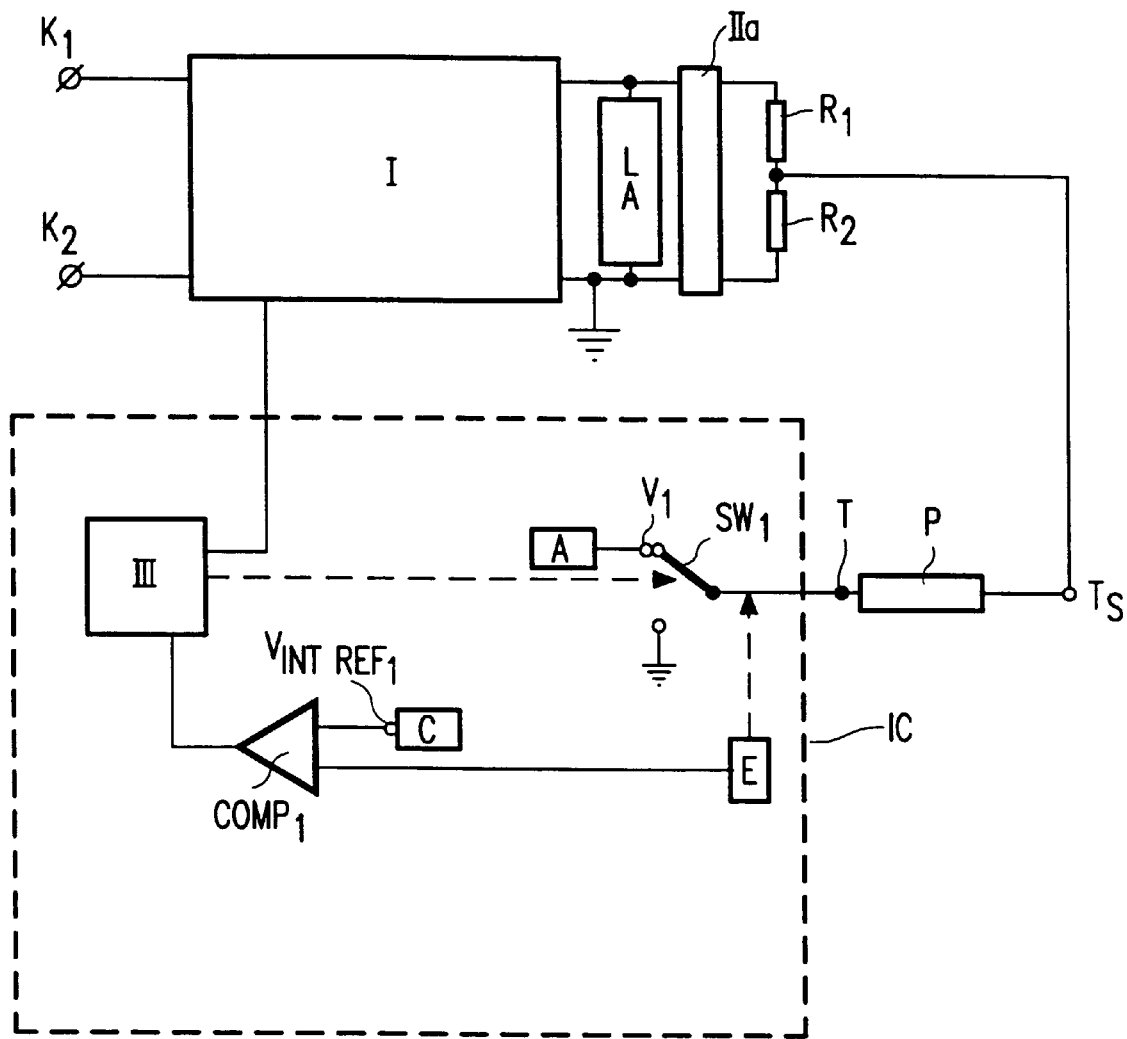

The embodiment shown in FIG. 1 can be substantially simplified. If the integrated circuit is so constructed that I1/I2=y is equal to 1, the first internal reference value will be equal to the second internal reference value. Only one circuit portion for generating the internal reference value is required in such an embodiment of the integrated circuit IC. Since the internal signal $S_{int}$ is to be compared with only a single internal reference value, the comparator means Comp need comprise only one comparator, and the switching element Sw2 is also redundant. A further simplification may be obtained in that the amplitude of voltage V2 is chosen to be equal to zero. Circuit portion B may now be formed in that the relevant main electrode of the switching element Sw1 is connected to ground potential. The integrated circuit IC can be of a comparatively simple construction as a result of this. Circuit portion I of the embodiment shown in FIG. I comprises a bridge circuit which contains two switching elements which are rendered conducting and non-conducting alternately at a high frequency f for generating the high-frequency current through the discharge lamp. A further advantage over the embodiment shown in FIG. 1 may be realized in that the switching element Sw1 changes the value of the voltage at input terminal T with the same frequency f, in synchronism with the cycle in which the switching elements in the bridge circuit are rendered conducting and non-conducting. The process of rendering the switching elements of the bridge circuit conducting and non-conducting gives rise to interference signals which are also present at terminal Ts and which accordingly can influence the value of the signal S. The interference generated by this switching, however, cannot influence the result of the comparison between the internal signal $S_{int}$ and the internal reference signal by the comparator means Comp if the switching of the switching elements in the bridge and in the integrated circuit is carried out in synchronism, and said comparison is carried out only in a time interval within which no switching takes place. FIG. 2 shows an embodiment of a circuit arrangement according to the invention in which the improvements mentioned in the present paragraph relative to the embodiment of FIG. 1 have been implemented. The control signal which controls both the switching elements of the bridge circuit and switching element Sw1 is generated by circuit portion III, which comprises the means III as well as the means IV in the embodiment shown in FIG. 2. An output of circuit portion III is for this purpose coupled to switching element Sw1. This coupling is indicated with a broken line in FIG. 2. The output of circuit portion III coupled to circuit portion I is coupled to control electrodes of the switching elements of the bridge circuit which forms a part of circuit portion I. Compared with the embodiment shown in FIG. 1, circuit portion B, circuit portion D, comparator Comp2, and switching element Sw2 are absent here. In addition, only one input of circuit portion III is coupled to the comparator means Comp. The construction of the embodiment shown in FIG. 2 corresponds to that of the embodiment shown in FIG. 1 in other respects, and corresponding components and circuit portions have been given the same reference symbols.

The operation of the circuit arrangement shown in FIG. 2 is as follows.

When the input terminals K1 and K2 are connected to a supply voltage source, the means I generate a high-frequency alternating current through the discharge lamp from a supply voltage delivered by this supply voltage source during stationary lamp operation. Before the stationary lamp operation phase, the circuit portion I generates an ignition voltage across the discharge lamp La during the ignition phase. A signal S generated by the means II is present at terminal Ts both during the ignition phase and during stationary lamp operation, signal S being a measure of the amplitude of the voltage across the discharge lamp La. The circuit portion III periodically changes the state of switching element Sw1 from a first to a second state and vice versa. Input terminal T is connected to the output of circuit portion A in the first state. Voltage V1 is present at the input terminal T. Input terminal T is connected to ground potential in the second state. Comparator Comp1 compares the internal signal $S_{int}$ generated by the circuit portion E with the internal reference signal generated by circuit portion C in both states. If the internal reference signal is exceeded in either state, the means III are activated via the output of comparator Comp1 and the input of circuit portion III. The means III change the operational state of the circuit portion I, for example by switching off circuit portion I.

The equations which are true for the embodiment shown in FIG. 2 are:

$$S1 = x*V1/(x-1)$$

$$S2 = V1/(x-1)$$

$$R = V1/(x-y)*I2$$

The ratio of the resistance values of ohmic resistors R1 and R2 is chosen such that the signal S at terminal Ts reaches the value S1 when the voltage across the discharge lamp reaches its maximum admissible value. Given this ratio of the resistance values of ohmic resistors R1 and R2, the signal at terminal Ts will reach the value S2 when the voltage across the discharge lamp La reaches its minimum admissible value. With the value R of ohmic resistor P as given by the equation, the internal reference value will correspond to the external reference value S1 with the integrated circuit in the first state and to the external reference value S2 with the integrated circuit in the second state. It is thus possible also in this embodiment to adjust the reference values S1 and S2 independently of one another to desired levels through a suitable choice of the resistance values of R1 and R2.

Figure 3:
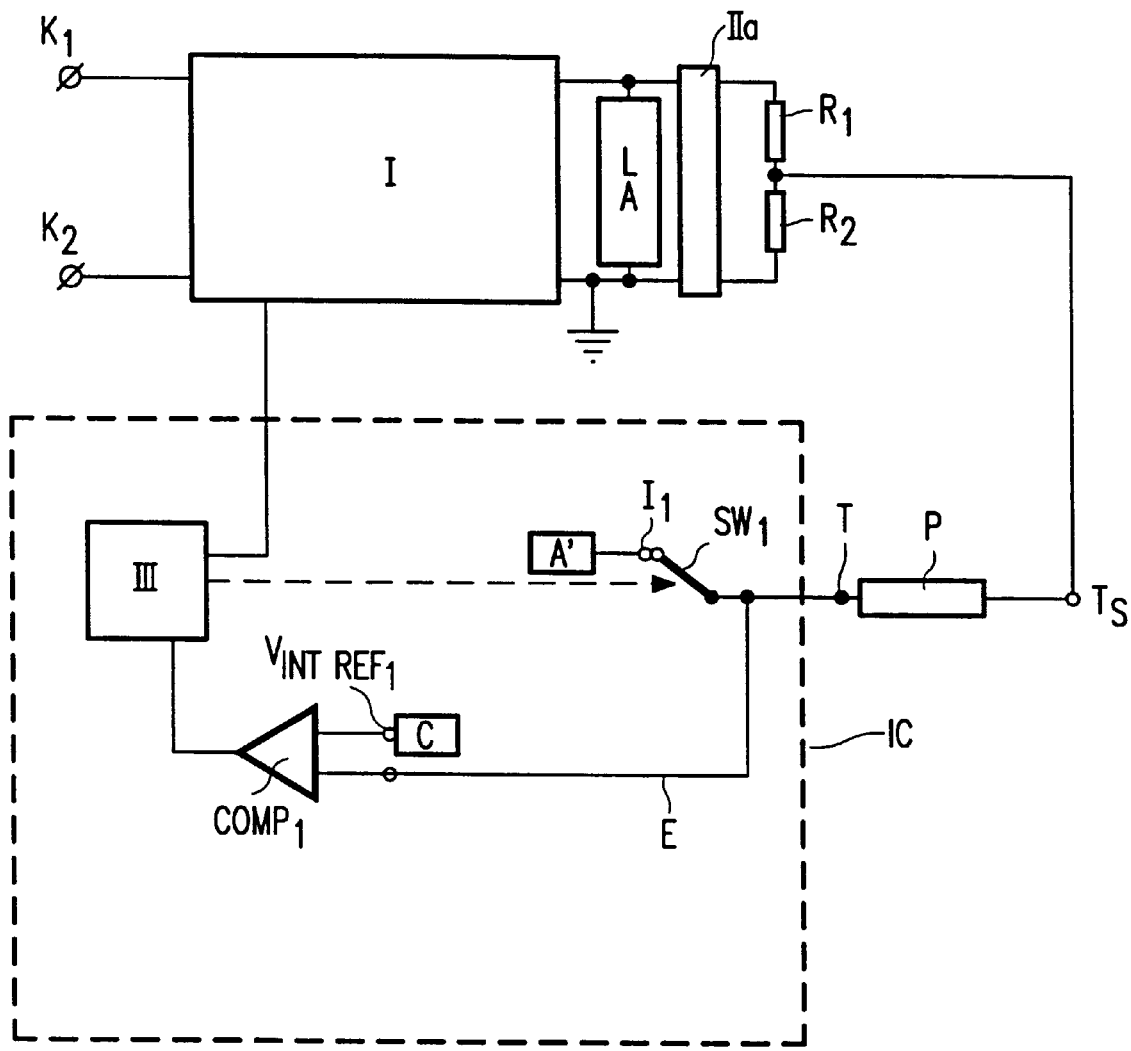

The embodiment shown in FIG. 3 utilizes, as does the embodiment shown in FIG. 2, only one internal reference value. The electrical quantity G in this embodiment is the current through the input terminal T, whose first value is I1 and whose second value is I2. I2 is chosen to be equal to zero here. The differences with the embodiment shown in FIG. 2 are that circuit portion A is replaced by circuit portion A' for generating a current with amplitude I1, and that circuit portion E is formed by a conductive connection between input terminal T and an input of comparator Comp1. The construction of the embodiment shown in FIG. 3 corresponds to that of the embodiment shown in FIG. 2 in other respects, and corresponding components and circuit portions have been given the same reference symbols.

The operation of the embodiment shown in FIG. 3 is as follows.

A signal S which is a measure of the voltage across the discharge lamp La is present at terminal Ts both during the ignition phase and during stationary lamp operation. The circuit portion III periodically changes the state of switching element Sw1 from a first to a second state and vice versa. In the first state, input terminal T is connected to the output of circuit portion A'. A current with amplitude I1 flows through the input terminal T. The current through the input terminal T is equal to zero in the second state. Comparator Comp1 compares the internal signal $S_{int}$ formed by the voltage at input terminal T with the internal reference signal generated by the circuit portion C in both states. If the internal reference signal is exceeded in either state, the means III are activated via the output of comparator Comp1 and the input of circuit portion III. The means III change the operational state of the circuit portion I, for example by switching off the circuit portion I. If the voltage at input terminal T is equal to the internal reference value V1 at the output of circuit portion C, it will be true for the embodiment shown in FIG. 3 that the voltage S1 at terminal Ts is:

$$S1 = I1*(R)P + V1, \tag{I}$$

in which (R)P is the resistance value of ohmic resistor P. This voltage S1 is the first reference voltage of the signal S. It is true in the second state that, if the voltage at input terminal T is equal to the internal reference value V1, the voltage S2 at terminal Ts is:

$$S2 = I2*(R)P + V1. \tag{II'}$$

Since the amplitude of I2 was chosen to be zero, these equations may alternatively be written as:

$$S1 = x*V1$$

$$S2 = V1$$

$$R = (x-1)*V1/I1$$

The ratio of the resistance values of ohmic resistors R1 and R2 is chosen such that the signal S at terminal Ts reaches the value S1 when the voltage across the discharge lamp reaches its maximum admissible value. Given this ratio of the resistance values of ohmic resistors R1 and R2, the signal at terminal Ts will reach the value S2 when the voltage across the discharge lamp La reaches its minimum admissible value. The internal reference value corresponds to the external reference value S1 in the first state of the integrated circuit and to the external reference value S2 in the second state of the integrated circuit, provided that the value of ohmic resistor R is in accordance with the equation. It is thus possible also in this embodiment to adjust the reference values S1 and S2 independently of one another to desired levels through a suitable choice of the resistance values of R1 and R2.

I claim:

1. A circuit arrangement for operating a discharge lamp, comprising:
   input terminals for coupling to a supply voltage source,
   means I coupled to the input terminals for generating a current through the discharge lamp from a supply voltage delivered by the supply voltage source,
   a control circuit for controlling the operational state of the means I, comprising;
      means II for generating a signal S which is a measure of the value of an operating parameter,
      an integrated circuit including:
         an input terminal coupled to the means II,
         means C for generating a first internal reference signal,
         means E coupled to the input terminal for generating an internal signal $S_{int}$ derived from the signal S,
         comparator means having an output, a first input coupled to the means C, and a second input coupled to the means E, and
         means III coupled to the output of the comparator means for changing the operational state of the means I,
   wherein the means II are coupled to the input terminal via an impedance, and the integrated circuit further comprises;
      means D coupled to the comparator means for generating a second internal reference signal,
      means IV for changing the amplitude of an electrical quantity G present at the input terminal from a first value to a second value, and for changing the operational state of the comparator means from a first state to a second state, said comparator means comparing the internal signal $S_{int}$ with the first internal reference signal in the first state and comparing the internal signal $S_{int}$ with the second internal reference signal in the second state.

2. A circuit arrangement as claimed in claim 1, wherein the electrical quantity G is the voltage applied to the input terminal, and the means IV include means for changing the amplitude of the voltage applied to the input terminal from a first value V1 to a second value V2.

3. A circuit arrangement as claimed in claim 2, wherein the second value V2 is equal to zero.

4. A circuit arrangement as claimed in claim 1, wherein the electrical quantity G is the current flowing through the input terminal, and the means IV include means for changing the amplitude of the current flowing through the input terminal from a first value I1 to a second value I2.

5. A circuit arrangement as claimed in claim 4, wherein the second value I2 is equal to zero.

6. A circuit arrangement as claimed in claim 1, wherein the means IV include means for periodically changing the amplitude of the electrical quantity G from the first to the second value and vice versa at a frequency f, and for periodically changing the operational state of the comparator means from the first state to the second state and vice versa.

7. A circuit arrangement as claimed in claim 6, wherein the means I comprise at least a switching element and means for rendering said switching element conducting and non-conducting at the frequency f during lamp operation in synchronism with the change in amplitude of the electrical quantity G and the change in the operational state of the comparator means.

8. A circuit arrangement as claimed in claim 1, wherein the impedance P comprises an ohmic resistor.

9. A circuit arrangement as claimed in claim 1, wherein the first internal reference signal is equal to the second internal reference signal, and the means D are formed by the means C.

10. The circuit arrangement as claimed in claim 1 wherein the operating parameter is the lamp voltage and the means II comprise first and second resistors responsive to a voltage determined by the lamp voltage, and the ratio of the resistance values of the first and second resistors at least in part determine the first and second internal reference signals.

11. The circuit arrangement as claimed in claim 1 wherein the operating parameter is the lamp voltage and the means II comprise first and second resistors responsive to a voltage determined by the lamp voltage, and the ratio of the resistance values of the first and second resistors and the resistance of said impedance determine the first and second internal reference signals.

12. A circuit arrangement as claimed in claim 3, wherein the means IV include means for periodically changing the amplitude of the electrical quantity G from the first to the second value and vice versa at a frequency f, and for periodically changing the operational state of the comparator means from the first state to the second state and vice versa.

13. A circuit arrangement as claimed in claim 5, wherein the means IV include means for periodically changing the amplitude of the electrical quantity G from the first to the second value and vice versa at a frequency f, and for periodically changing the operational state of the comparator means from the first state to the second state and vice versa.

14. An apparatus for operating a discharge lamp, comprising:
   input terminals for a source of supply voltage,
   means I coupled to the input terminals for generating a current through the discharge lamp from a supply voltage at the input terminals,
   a control circuit for controlling the operation of the means I, comprising;
      means II for generating a signal (S) which is determined by an operating parameter of the apparatus,
      an integrated circuit including;
         an input terminal coupled to the means II,
         means for generating an internal reference signal,
         means coupled to the input terminal for generating an internal signal derived from the signal (S),
         comparator means having an output, a first input coupled to the internal reference signal generating means, and a second input coupled to the internal signal generating means, and
         means III coupled to the output of the comparator means for changing the operational state of the means I, wherein
      the means II are coupled to the input terminal via an impedance, and the integrated circuit further comprises;
         switching means having a first state and a second state for changing the amplitude of an electrical quantity (G) present at the input terminal from a first value to a second value, said comparator means comparing the internal signal with the internal reference signal in the first and second state of said switching means.

15. The apparatus for operating a discharge lamp as claimed in claim 14 wherein the electrical quantity (G) is the voltage applied to the input terminal, and the switching means include means for changing the amplitude of the voltage applied to the input terminal from a first value V1 to a second value V2.

16. The apparatus for operating a discharge lamp as claimed in claim 15 wherein the second value V2 is equal to zero.

17. The apparatus for operating a discharge lamp as claimed in claim 14 wherein the electrical quantity (G) is a current flowing through the input terminal, and the switching means include means for changing the amplitude of the current flowing through the input terminal from a first value I1 to a second value I2.

18. The apparatus for operating a discharge lamp as claimed in claim 17 wherein the second value I2 is equal to zero.

19. The apparatus as claimed in claim 14 wherein the means I comprise at least one switching element, and the means III controls, in synchronism during lamp operation, and at a frequency f, the switching of said at least one switching element and said switching means.

20. The apparatus as claimed in claim 19 wherein the operating parameter is the lamp voltage.

21. The circuit arrangement as claimed in claim 1 wherein the means IV comprise means for periodically changing the operational state of the comparator means from the first state to the second state and vice versa.

22. The circuit arrangement as claimed in claim 1 wherein said input terminal of the integrated circuit is the only input terminal for supplying the integrated circuit with a signal determined by an operating parameter of the discharge lamp.

23. The circuit arrangement as claimed in claim 1 wherein the means IV comprise means for periodically changing the amplitude of the electrical quantity G from the first to the second value and vice versa at a frequency f.

24. An apparatus for operating a discharge lamp comprising:

means for supplying an alternating voltage to the discharge lamp, means for generating a signal (S) determined by an operating parameter of the discharge lamp, an integrated control circuit having a signal input terminal for receiving said signal (S) via an impedance element and an output for supplying a control signal to said lamp voltage supplying means for controlling the operation thereof, and switching means for periodically switching the integrated circuit between first and second states thereby changing the amplitude of an electrical quantity (G) present at the input terminal from a first value to a second value and in turn the control signal in a manner to control operation of the discharge lamp via said lamp voltage supplying means.

* * * * *